US007891245B2

(12) United States Patent
Murakami et al.

(10) Patent No.: US 7,891,245 B2
(45) Date of Patent: Feb. 22, 2011

(54) INERTIAL FORCE SENSOR INCLUDING A SENSE ELEMENT, A DRIVE CIRCUIT, A SIGMA-DELTA MODULATOR AND A SIGNAL PROCESSING CIRCUIT

(75) Inventors: Hideyuki Murakami, Osaka (JP); Takashi Kawai, Fukui (JP)

(73) Assignee: Panasonic Corporation, Osaka (JP)

( * ) Notice: Subject to any disclaimer, the term of this patent is extended or adjusted under 35 U.S.C. 154(b) by 549 days.

(21) Appl. No.: 11/942,828

(22) Filed: Nov. 20, 2007

(65) Prior Publication Data
US 2008/0115580 A1    May 22, 2008

(30) Foreign Application Priority Data
Nov. 22, 2006  (JP)  ............... 2006-315221
Nov. 22, 2006  (JP)  ............... 2006-315222
Nov. 22, 2006  (JP)  ............... 2006-315223

(51) Int. Cl.
*G01P 9/04*   (2006.01)
*G01C 19/56*  (2006.01)
(52) U.S. Cl. .................. 73/504.16; 73/504.12
(58) Field of Classification Search ............. 73/504.16, 73/504.12, 504.04, 504.13, 504.14, 504.15
See application file for complete search history.

(56) References Cited
U.S. PATENT DOCUMENTS
5,459,432 A * 10/1995 White et al. ............... 329/307

| | | | |
|---|---|---|---|
| 6,257,057 B1 * | 7/2001 | Hulsing, II | ............... 73/504.04 |
| 6,934,665 B2 * | 8/2005 | Rober | ............... 702/189 |
| 7,123,111 B2 * | 10/2006 | Brunson et al. | ............... 331/116 M |
| 7,288,946 B2 * | 10/2007 | Hargreaves et al. | ............... 324/678 |
| 7,337,671 B2 * | 3/2008 | Ayazi et al. | ............... 73/514.32 |
| 2010/0013688 A1 * | 1/2010 | Murakami et al. | ............... 341/143 |

FOREIGN PATENT DOCUMENTS
JP        9-281138     10/1997
JP        2007-218717   8/2007

* cited by examiner

*Primary Examiner*—Helen C. Kwok
(74) *Attorney, Agent, or Firm*—Wenderoth, Lind & Ponack, L.L.P.

(57) ABSTRACT

The present invention particularly relates to an inertial force sensor used in various electronic equipment, for example, used for altitude control, navigation, or the like, of a mobile body such as an aircraft, an automobile, a robot, a watercraft and a vehicle in which the detection accuracy is enhanced. Therefore, a sense circuit constituting the inertial force sensor includes a sigma-delta modulator converting a sense signal output from a sense electrode into a one-bit digital signal, and a signal processing circuit (i) comparing a monitor signal output from a monitor electrode with predetermined reference amplitude information, (ii) carrying out operation processing of the one-bit digital signal based on this comparison information, and (iii) adjusting an output level of the output signal.

6 Claims, 5 Drawing Sheets

INERTIAL FORCE SENSOR INCLUDING A SENSE ELEMENT, A DRIVE CIRCUIT, A SIGMA-DELTA MODULATOR AND A SIGNAL PROCESSING CIRCUIT

BACKGROUND OF THE INVENTION

1. Field of the Invention

The present invention particularly relates to an inertial force sensor used in various electronic equipment, for example, used for altitude control, navigation, or the like, of a mobile body such as an aircraft, an automobile, a robot, a watercraft and a vehicle.

2. Background Art

In a conventional inertial force sensor, a tuning fork-shaped sense element is allowed to oscillate and an inertial force applied to the sense element is detected by using a Coriolis force. Therefore, in order to make the amplitude of the sense element constant, an AGC circuit is provided in a drive circuit for oscillating the sense element. Prior art information relating to the invention of this application includes, for example, Japanese Patent Unexamined Publication No. H9-281138.

However, since the AGC circuit includes many analog elements, the temperature properties of the elements are accumulated and the size of the AGC circuit is increased. It is therefore difficult to make the amplitude of the sense element constant. As a result, the detection accuracy of the inertial force sensor is affected.

SUMMARY OF THE INVENTION

The present invention addresses the problems discussed above, and has an object to improve the detection accuracy of an inertial force sensor.

In order to achieve the object, in the present invention, a sense circuit constituting an inertial force sensor is configured to have a sigma-delta modulator for converting a signal output from a sense electrode into a one-bit digital signal; and a signal processing circuit for comparing a monitor signal output from a monitor electrode with predetermined reference amplitude information, carrying out operation processing of the one-bit digital signal based on the comparison information, and adjusting an output level of the output signal.

Furthermore, in the present invention, a drive circuit constituting an inertial force sensor is configured to: (i) analog-to-digital convert a monitor signal output from a monitor electrode so as to generate a digital value and amplitude information of the monitor signal; (ii) compare the amplitude information with predetermined reference amplitude information so as to generate comparison information; (iii) carry out operation processing of the digital value of the monitor signal based on the comparison information so as to convert the digital value of the monitor signal into a multi-bit signal; (iv) convert the multi-bit signal into a predetermined output signal; and (v) output the output signal to the drive electrode.

Furthermore, in the present invention, a drive circuit constituting an inertial force sensor is configured to: (i) sigma-delta convert a monitor signal output from a monitor electrode into a one-bit digital signal so as to generate amplitude information; (ii) compare the amplitude information with predetermined reference amplitude information so as to generate comparison information; (iii) carry out operation processing of the monitor signal based on the comparison information so as to convert the monitor signal into a multi-bit signal; (iv) convert the multi-bit signal into a predetermined output signal; and (v) output the output signal to a drive electrode. The operation processing includes operating a rectangular wave signal formed from the monitor signal with the comparison information.

With such configurations, the detection accuracy of the inertial force sensor can be enhanced.

DETAILED DESCRIPTION OF THE INVENTION

Hereinafter, an inertial force sensor in accordance with embodiments of the present invention is described with reference to drawings.

First Embodiment

Figure 1:
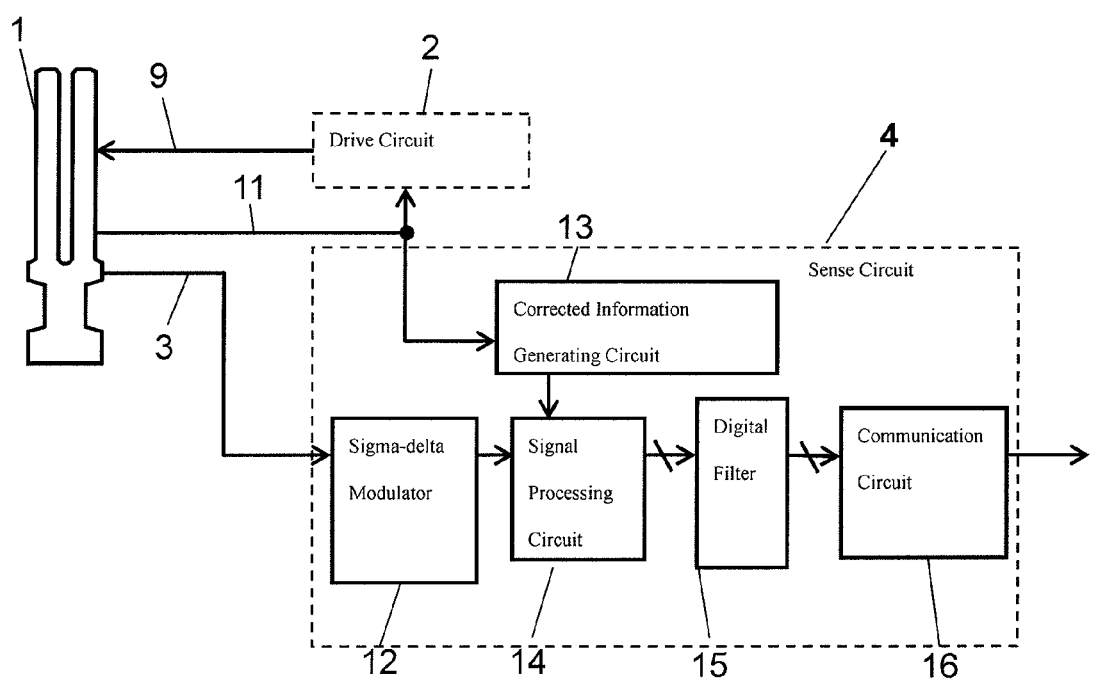
FIG. 1 is a circuit block diagram showing an angular velocity sensor in accordance with a first embodiment of the present invention.

FIG. 1 shows a circuit block of an angular velocity sensor as an inertial force sensor in accordance with a first embodiment of the present invention. The configuration of the sensor roughly includes sense element 1, drive circuit 2 for oscillating sense element 1, and sense circuit 4 for electrically processing sense signal 3 output from sense element 1.

Figure 2:
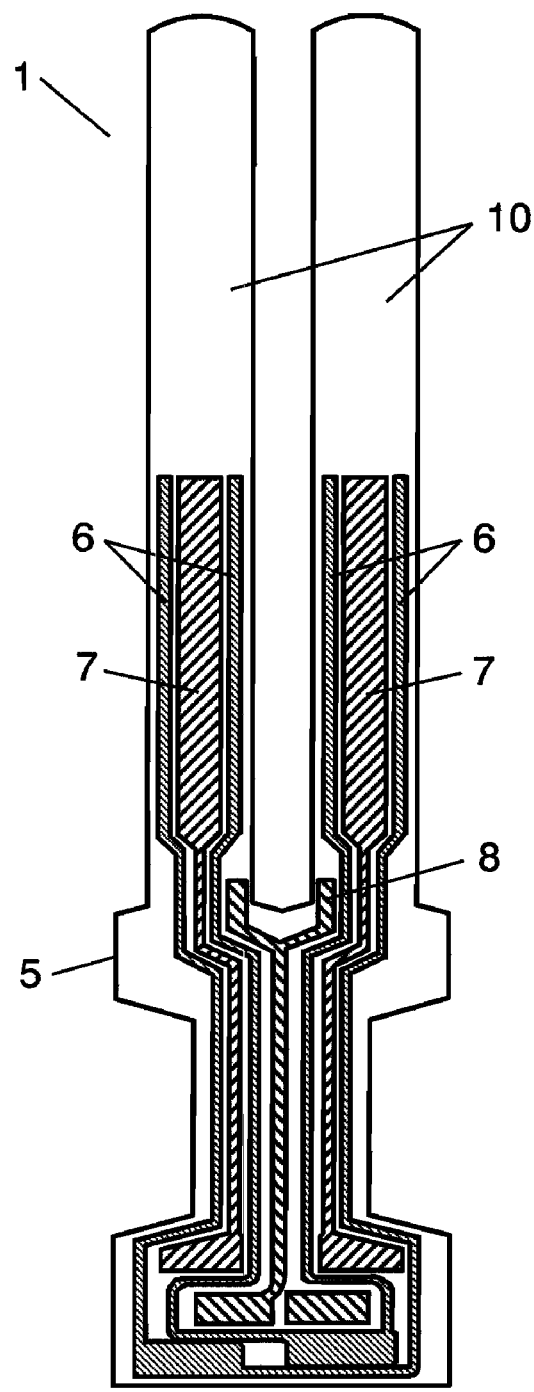
FIG. 2 is a view showing a sense element constituting an angular velocity sensor in accordance with the first embodiment of the present invention.

Sense element 1 includes drive electrode 6, sense electrode 7 and monitor electrode 8 formed on tuning fork-shaped silicone board 5 as shown in FIG. 2. By applying drive signal 9 of a predetermined frequency to drive electrode 6 from drive circuit 2, drive arm 10 of sense element 1 is allowed to oscillate in the left and right direction in FIG. 2. When an angular velocity is applied to sense element 1 in this state, a Coriolis force is generated and drive arm 10 is bent in the back and force direction in FIG. 2. With this bending, sense signal 3 is output from sense electrode 7. Although not particularly shown, drive electrode 6, sense electrode 7 and monitor electrode 8 have a structure in which a PZT thin film is sandwiched between the upper and lower electrodes. Note here that monitor electrode 8 detects a state of the oscillation of sense element 1 and outputs a signal corresponding to the oscillation of the tuning fork as monitor signal 11.

This angular velocity sensor includes: sigma-delta modulator (hereinafter, referred to as "$\Sigma\Delta$") 12 for converting sense signal 3 into a one-bit digital signal; corrected information generating circuit 13 for detecting the peak-to-peak of monitor signal 11 and comparing the amplitude information of the monitor signal 11 with predetermined reference amplitude information so as to generate corrected information; signal processing circuit 14 for carrying out operation processing of the one-bit digital signal output from $\Sigma\Delta$ 12 with the corrected information; digital filter 15 for filtering a multi-bit signal formed in signal processing circuit 14; and communication circuit 16 for storing this filtered multi-bit signal and communicating to the outside. In particular, this structure does not include an AGC circuit that was conventionally provided in order to make the amplitude of sense element 1 constant.

Note here that ΣΔ 12 oversamples an analog signal output from sense electrode 7 and converts the signal into a one-bit digital signal by sigma-delta conversion.

Then, signal processing circuit 14 converts the one-bit digital signal formed from sense signal 3 in ΣΔ 12 into a multi-bit signal according to the magnification obtained in corrected information generating circuit 13. For example, when the magnification of the corrected information is "5" and the one-bit digital signal is " . . . 0011010 . . . ," the signal is converted into a multi-bit signal, " . . . 0055050 . . . ." Herein, since the one-bit digital signal is a one-bit signal, 0 or 1, when the magnification of the corrected information is decided and the magnification is substituted for the signal "1," the signal can be converted into a multi-bit signal. Therefore, multiplication processing and the like, which is generally carried out, is not required, thus enabling the processing circuit to be simplified.

By configuring the angular velocity sensor in this way, an AGC circuit in which the temperature property in drive circuit 2 is large is eliminated. Accordingly, the above-mentioned output level processing is introduced and carried out by digital processing. Therefore, it is possible to suppress a signal fluctuation due to a temperature change. Consequently, drive circuit 2 can be simplified, and the detection accuracy of the angular velocity sensor can be enhanced.

Since ΣΔ 12 converts a signal into a one-bit digital signal, the signal can be converted into a multi-bit digital signal by an A/D converter without using ΣΔ 12 mentioned above. However, since ΣΔ 12 has an integrator function inside thereof as a circuit configuration, it is possible to reduce the size of the circuit.

Note here that in the above-mentioned first embodiment, as a processing carried out in sense circuit 4, controlling of the output level according to the amplitude fluctuation with respect to sense signal 3 is described. However, the processing carried out in sense circuit 4 is not limited to this alone. Sense circuit 4 is a portion also carrying out additional processing for eliminating undesired signals caused by variation in the shape of sense element 1 and undesired connection between electrodes such as drive electrode 6 and sense electrode 7. As to this elimination of undesired signals, various processings such as that disclosed in Japanese Patent Unexamined Publication No. H9-281138 are carried out.

Furthermore, in the above-mentioned first embodiment, an angular velocity sensor is described as an example of the inertial force sensor. However, the inertial force sensor can be applied to an acceleration sensor and the like as long as sense element 1 is oscillated and a Coriolis force is used.

The inertial force sensor in accordance with the first embodiment of the present invention can enhance the detection accuracy of the inertial force sensor and is useful as an inertial force sensor used in various equipment.

Second Embodiment

Hereinafter, an inertial force sensor in accordance with a second embodiment of the present invention is described with reference to FIG. 3.

Figure 3:
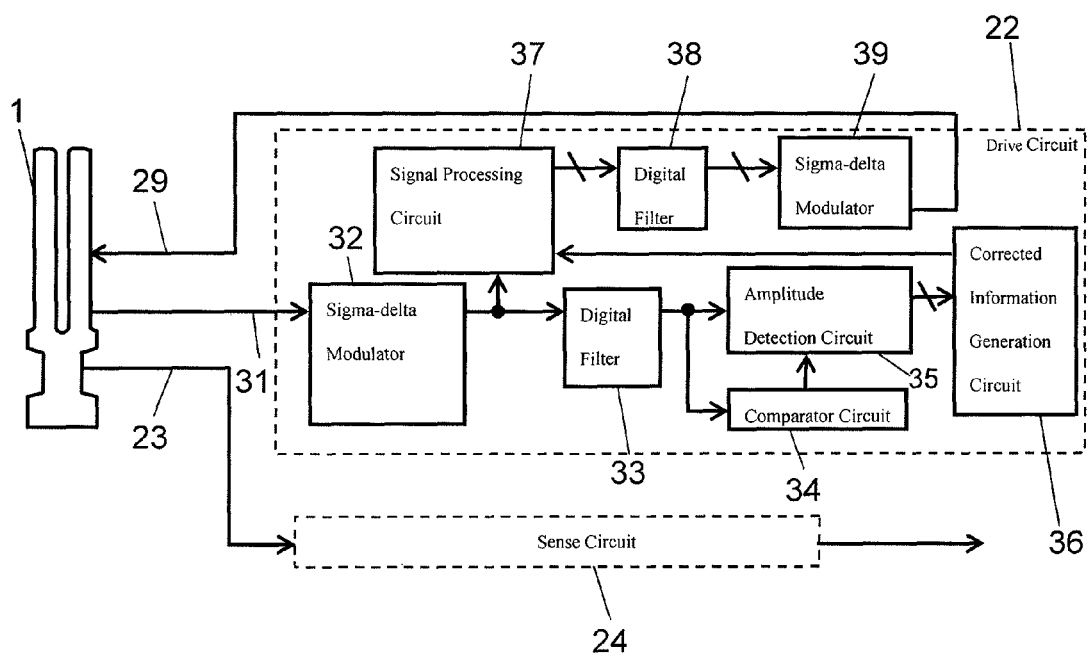
FIG. 3 is a circuit block diagram showing an angular velocity sensor in accordance with a second embodiment of the present invention.

FIG. 3 shows a circuit block of an angular velocity sensor as an inertial force sensor in accordance with the second embodiment of the present invention. The configuration of the sensor roughly includes sense element 1, drive circuit 22 for oscillating sense element 1, and sense circuit 24 for electrically processing sense signal 23 output from sense element 1.

Since sense element 1 is the same as that shown in FIG. 2 and described in the first embodiment, the description thereof is omitted.

As shown in FIG. 3, drive circuit 22 of this angular velocity sensor includes: sigma-delta modulator (hereinafter, referred to as "ΣΔ") 32 for AD converting monitor signal 31 into a one-bit digital signal; digital filter 33 for converting the one-bit digital signal output from ΣΔ 32 into a multi-bit signal; comparator circuit 34 for detecting a zero cross of this multi-bit signal so as to generate phase information; amplitude detection circuit 35 for detecting the peak-to-peak of each cycle from the phase information and the above-mentioned multi-bit signal; corrected information generating circuit 36 for comparing amplitude information obtained by the detection of peak-to-peak with predetermined reference amplitude information so as to generate corrected information; signal processing circuit 37 for carrying out operation processing of the one-bit digital signal output from ΣΔ 32 with the corrected information; digital filter 38 for filtering a multi-bit drive signal formed in signal processing circuit 37; and ΣΔ 39 for converting this filtered multi-bit drive signal into one-bit digital signal 29 and outputting it to drive electrode 6.

Note here that ΣΔ 32 for carrying out AD conversion oversamples an analog signal (monitor signal 31) output from monitor electrode 8 and converts the signal into a one-bit digital signal by sigma-delta conversion.

Then, signal processing circuit 37 converts the one-bit digital signal formed from monitor signal 31 in ΣΔ 32 into a multi-bit signal according to the magnification obtained from the corrected information. For example, when the magnification of the corrected information is "5" and the one-bit digital signal is " . . . 0011010 . . . ," the signal is converted into a multi-bit signal, " . . . 0055050 . . . ." Herein, since the one-bit digital signal is a one-bit signal, 0 or 1, when the magnification of the corrected information is decided and the magnification is substituted for the signal "1," the signal can be converted into a multi-bit signal. Therefore, multiplication processing and the like, which is generally carried out, is not required, thus enabling the processing circuit to be simplified.

By configuring the angular velocity sensor in this way, drive circuit 22 is operated by digital signal processing, and a signal fluctuation due to a temperature change is suppressed. Therefore, it is possible to make the amplitude of sense element 1 constant, thus enabling the detection accuracy of the angular velocity sensor to be enhanced.

Since ΣΔ 32 for carrying out AD conversion converts a signal into a one-bit digital signal, a signal obtained by an I/V converter or an integrator can be also converted into a multi-bit digital signal by a successive approximation type A/D converter without using the above-mentioned ΣΔ 32. However, since ΣΔ 32 has an integrator function inside thereof as a circuit configuration, it is possible to reduce the size of the circuit.

Furthermore, since ΣΔ 39 converts a multi-bit signal into a one-bit digital signal, a signal can be converted into an analog signal by using a D/A converter without using ΣΔ 39 and can be output to drive electrode 6. However, by converting the signal into a one-bit digital signal by ΣΔ 39, sense element 1 can be oscillated directly with this one-bit digital signal, thus enabling the size of the circuit to be reduced.

In the above-mentioned second embodiment, an angular velocity sensor is described as an example in of the inertial force sensor. However, the inertial force sensor can be applied to an acceleration sensor and the like as long as sense element 1 is oscillated and a Coriolis force is used.

The inertial force sensor in accordance with the second embodiment can enhance the detection accuracy of the inertial force sensor and is useful as an inertial force sensor used in various equipment.

Third Embodiment

Hereinafter, an inertial force sensor in accordance with a third embodiment of the present invention is described with reference to FIG. 4.

Figure 4:
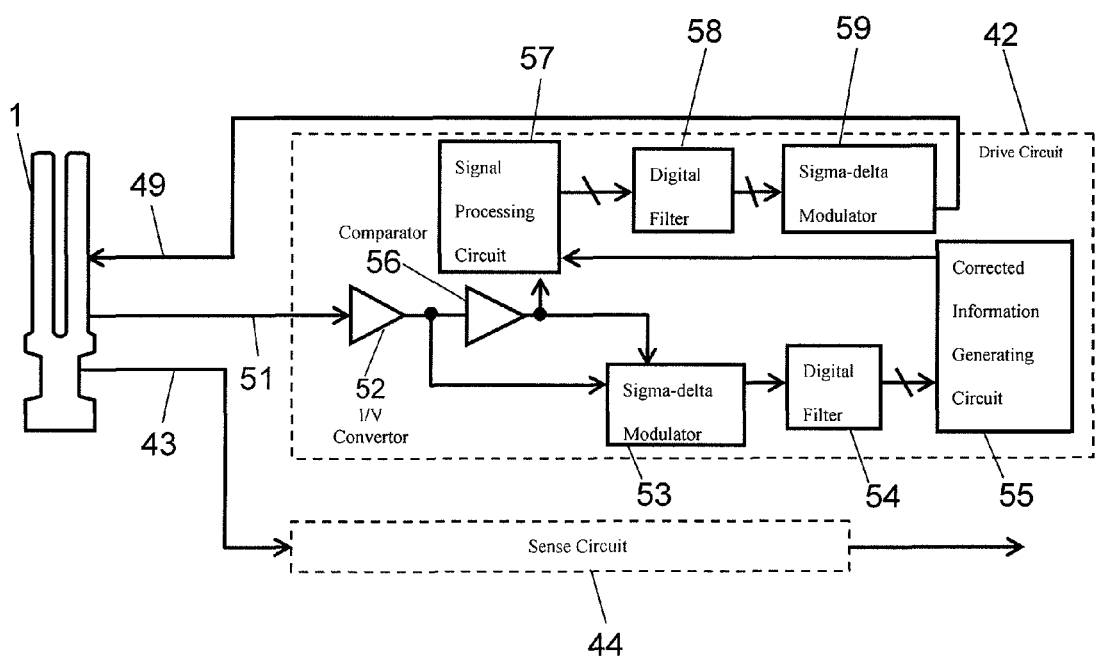
FIG. 4 is a circuit block diagram showing an angular velocity sensor in accordance with a third embodiment of the present invention.

FIG. 4 shows a circuit block of an angular velocity sensor as an inertial force sensor in accordance with the third embodiment of the present invention. The configuration of the sensor roughly includes sense element 1, drive circuit 42 for oscillating sense element 1, and sense circuit 44 for electrically processing sense signal 43 output from sense element 1.

Since sense element 1 is the same as that shown in FIG. 2 and described in the first embodiment, the description thereof is omitted.

Figure 5:
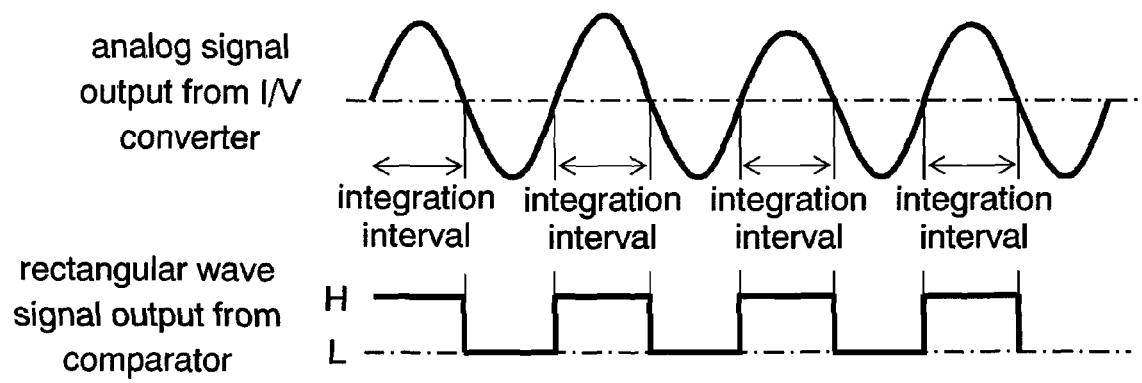
FIG. 5 is a diagram showing a flow of a signal processing in a sigma-delta modulator constituting a circuit block in accordance with the third embodiment.

As shown in FIG. 4, drive circuit 42 of this angular velocity sensor includes: I/V converter 52 into which monitor signal 51 is input; sigma-delta modulator (hereinafter, referred to as "ΣΔ") 53 for converting the output signal from I/V converter 52 into a one-bit digital signal; digital filter 54 for converting this one-bit digital signal into a multi-bit signal; corrected information generating circuit 55 for comparing amplitude information possessed by this multi-bit signal with predetermined reference amplitude information so as to generate corrected information; comparator 56 for converting the output signal from I/V converter 52 into a rectangular wave signal; signal processing circuit 57 for converting this rectangular wave signal into a discrete value at a predetermined cycle so as to carry out operation processing with the corrected information; digital filter 58 for filtering the multi-bit signal formed in signal processing circuit 57; and ΣΔ 59 for converting this filtered multi-bit signal into one-bit digital signal 49 and outputting it to drive electrode 6. As shown in FIG. 5, ΣΔ 53 integrates an analog signal output from I/V converter 52 in accordance with the rectangular wave signal output from comparator 56. For example, integration is carried out in each period in which the rectangular wave signal shows High (expressed by 'H' in FIG. 5). This integrated signal is used as an input signal and sigma-delta conversion is carried out, thereby converting the amplitude information of monitor signal 51 into the one-bit digital signal.

Then, signal processing circuit 57 converts the rectangular wave signal formed in comparator 56 into a discrete signal. According to this discrete signal and a magnification obtained from the corrected information, the signal is converted into the multi-bit signal. For example, when the magnification of the corrected information is "5" and the discrete signal is ". . . 0011010 . . . ," the signal is converted into the multi-bit signal, ". . . 0055050 . . . ." Herein, since the discrete signal is a one bit signal, 0 or 1, when the magnification of the corrected information is decided and the magnification is substituted for the signal "1," the signal can be converted into a multi-bit signal. Therefore, multiplication processing and the like, which is generally carried out, is not required, thus enabling the processing circuit to be simplified.

By configuring the angular velocity sensor in this way, drive circuit 42 is operated by digital signal processing, and a signal fluctuation due to a temperature change is suppressed. Therefore, it is possible to make the amplitude of sense element 1 constant, thus enabling the detection accuracy of the angular velocity sensor to be enhanced.

Since ΣΔ 53 converts a signal into a one-bit digital signal, the value obtained by an integrator can be also converted into a multi-bit digital signal by a successive approximation type A/D converter without using the above-mentioned ΣΔ 53. However, since ΣΔ 53 has an integrator function inside thereof as a circuit configuration, it is possible to reduce the size of the circuit.

Furthermore, since ΣΔ 59 converts a multi-bit signal into a one-bit digital signal by operation processing, the signal can be converted into an analog signal by using a D/A converter without using ΣΔ 59 and can be output to drive electrode 6. However, by converting the signal into a one-bit digital signal by using ΣΔ 59, sense element 1 can be oscillated directly with this one-bit digital signal, thus enabling the size of the circuit to be reduced.

In the above-mentioned third embodiment, an angular velocity sensor is described as an inertial force sensor. However, the inertial force sensor can be applied to an acceleration sensor and the like as long as sense element 1 is oscillated and a Coriolis force is used.

The inertial force sensor in accordance with the third embodiment can enhance the detection accuracy of the inertial force sensor and is useful as an inertial force sensor used in various equipment.

What is claimed is:

1. An inertial force sensor comprising:
   a sense element including a drive electrode, a sense electrode and a monitor electrode, the monitor electrode outputting a monitor signal corresponding to an oscillation of the sense element;
   a drive circuit for driving the sense element at a predetermined driving frequency; and
   a sense circuit for electrically processing a signal output from the sense electrode,
   wherein the sense circuit includes:
      a sigma-delta modulator for converting the signal output from the sense electrode into a one-bit digital signal; and
      a signal processing circuit for comparing the monitor signal with predetermined reference amplitude information, carrying out operation processing of the one-bit digital signal based on a result of the comparing, and adjusting an output level of the signal output from the sense electrode.

2. An inertial force sensor comprising:
   a sense element including a drive electrode, a sense electrode and a monitor electrode;
   a drive circuit for detecting a monitor signal output from the monitor electrode and forming a drive signal with respect to the drive electrode; and
   a sense circuit for electrically processing a sense signal output from the sense electrode,
   wherein the drive circuit:
      sigma-delta converts the monitor signal output from the monitor electrode into a one-bit digital signal so as to generate amplitude information;
      compares the amplitude information with predetermined reference amplitude information so as to generate comparison information;
      carries out operation processing of the monitor signal based on the generated comparison information so as to convert the monitor signal into a multi-bit signal;
      converts the multi-bit signal into a predetermined output form of a signal; and
      outputs the predetermined output form of the signal to the drive electrode, and wherein the operation processing of the monitor signal includes operating a rectangular wave signal formed from the monitor signal with the comparison information.

3. The inertial force sensor of claim 2, wherein the multi-bit signal is converted into a one-bit digital signal by sigma-delta conversion, and the one-bit digital signal converted from the multi-bit signal is output to the drive electrode.

4. The inertial force sensor according to claim 1, wherein the signal processing circuit filters the one-bit digital signal after carrying out the operation processing of the one-bit digital signal, the one-bit digital signal being filtered based on the comparison information.

5. The inertial force sensor according to claim 1, wherein the signal processing circuit filters the one-bit digital signal after the one-bit digital signal is substituted with a value decided from the result of the comparing.

6. An inertial force sensor comprising:
a sense element including a drive electrode, a sense electrode and a monitor electrode, the monitor electrode outputting a monitor signal corresponding to an oscillation of the sense element;
a drive circuit for detecting the monitor signal and forming a drive signal with respect to the drive electrode; and
a sense circuit for electrically processing a sense signal output from the sense electrode,
wherein the drive circuit:
sigma-delta converts the monitor signal output from the monitor electrode into a one-bit digital signal and generates a digital value and amplitude information of the monitor signal;
compares the amplitude information with predetermined reference amplitude information so as to generate comparison information;
carries out operation processing of the one-bit digital signal based on the generated comparison information so as to convert the one-bit digital signal into a multi-bit drive signal;
converts the multi-bit drive signal into a predetermined output signal; and
outputs the predetermined output signal to the drive electrode.

* * * * *